Jan. 11, 1944.  R. C. INGWERSEN  2,339,078
EYE SHIELD
Filed Aug. 3, 1940   2 Sheets-Sheet 1
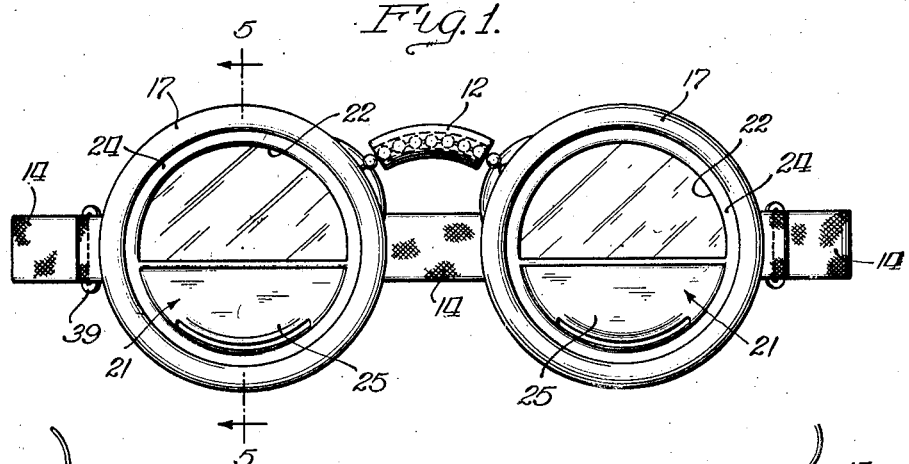
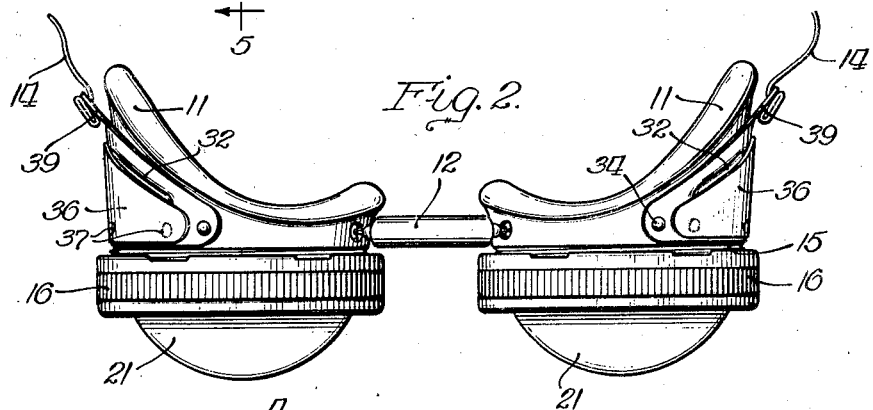
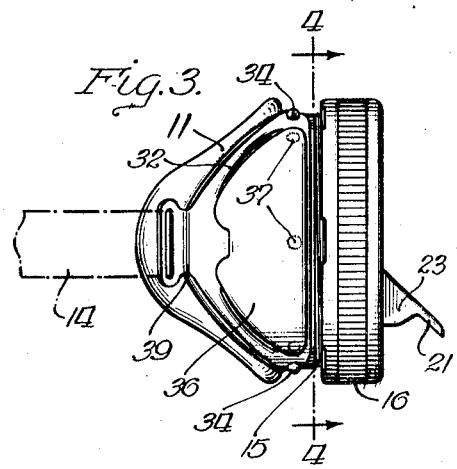
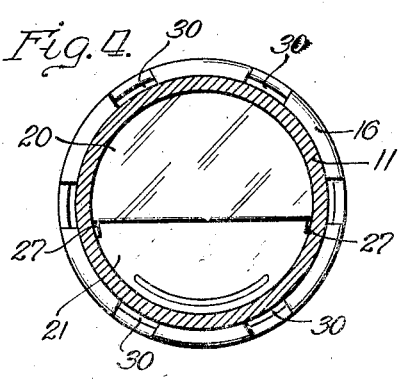
INVENTOR.
Richard C. Ingwersen
BY
Attys.

Jan. 11, 1944. R. C. INGWERSEN 2,339,078
EYE SHIELD
Filed Aug. 3, 1940 2 Sheets-Sheet 2
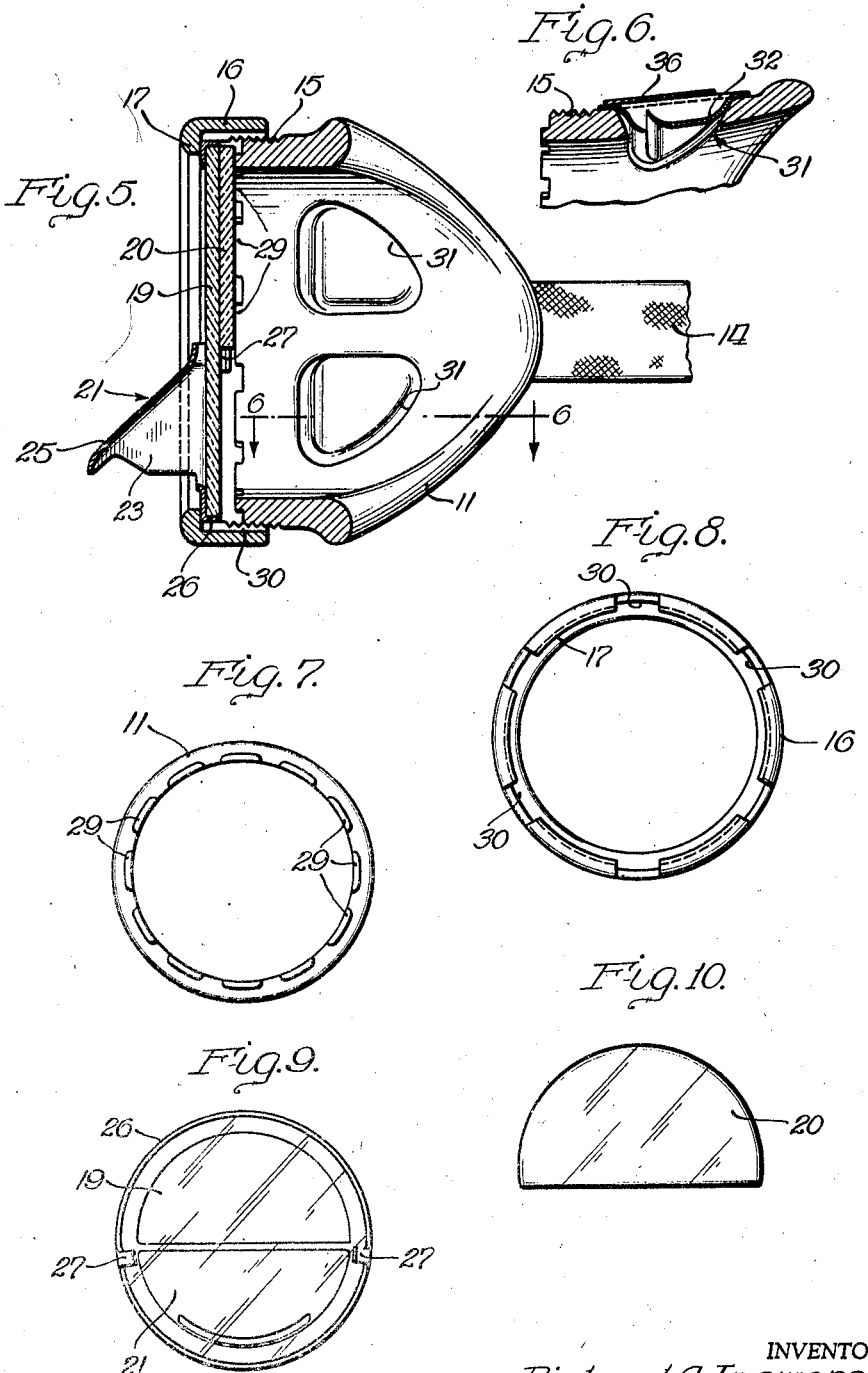
INVENTOR.
Richard C. Ingwersen
BY
Attys.

Patented Jan. 11, 1944

2,339,078

UNITED STATES PATENT OFFICE 2,339,078

EYE SHIELD

Richard C. Ingwersen, Elgin, Ill.

Application August 3, 1940, Serial No. 350,775

3 Claims. (Cl. 2—14)

This invention relates to eye shields, and more particularly to goggles or other eye protecting devices adapted for use in welding, metal cutting, etc..

The arc or flame characteristic of electric or gaseous welding and cutting operations is of such intense brilliance that the eyes must be protected by deeply colored lenses. These lenses are virtually opaque in daylight, and consequently when the welder extinguishes the arc or flame momentarily for purpose of adjusting the welding electrodes, or adjusting the work, it is usually necessary to remove the goggles in order to see well enough to perform these adjusting operations. Various devices have been designed for removing the dark lenses, or for tilting the goggles or hoods, but they have proved cumbersome and impractical in use.

The goggles of my invention are fitted with lenses provided with shaded portions and clear portions. When the user is in a working position, the shaded portions of the lenses are positioned to shade the eyes; however, to see through the clear portions the user has only to tilt his head back slightly. A shield prevents the penetrating rays of the welding flame from entering through the clear portions.

Another feature of the invention resides in the fact that the lenses may be adjusted angularly in their frames to place the clear portions at different positions; for instance, if the operator's work is located overhead, he may wish to have the clear portions positioned at the top of the goggle frame to relieve him of tilting his head back too far.

The lenses are actually of two distinct parts, clear lenses with shaded segments placed over them, leaving a portion of the clear lenses unobstructed. In the event that they are being used in work in which there are no sparks flying, the clear lenses may be dispensed with. It is obvious that the goggles need not be limited to welding operations; they are equally adaptable to use in grinding operations or other similar uses. In the latter case, the shaded segments may be dispensed with, using only the clear lenses to shield the eyes from flying chips.

Another feature of the goggles resides in their construction whereby ventilation is provided, eliminating condensation on the lenses.

In order to acquaint those skilled in the art with the manner of constructing a device in accordance with my invention, I shall now describe in connection with the accompanying drawings, a specific embodiment thereof.

In the drawings:

Figure 1 is a front view of the goggles of my invention;

Figure 2 is a top view of the goggles;

Figure 3 is an end view thereof;

Figure 4 is a sectional view taken on the line 4—4 of Figure 3;

Figure 5 is a sectional view taken on the line 5—5 of Figure 1;

Figure 6 is a sectional view taken on the line 6—6 of Figure 5;

Figure 7 is a front view of a single goggle frame with the lenses removed;

Figure 8 is a rear view of the ferrule for securing the lenses to the goggle frame;

Figure 9 is a rear view of the clear lens and the shield; and

Figure 10 shows the segmental shaded lens.

Referring now in detail to the drawings, Figures 1, 2, and 3 show the goggles as a whole which comprise frames 11 interconnected with a bridge piece 12. This bridge piece fits across the upper part of the nose, and cooperates with the band 14, made to fit around the head, to hold the goggles in place on the wearer. As shown in Figures 2 and 3, the frames 11 are formed to fit snugly to the face to prevent the entrance of sparks and flying particles. These frames are formed of a light molded material, such as a molded plastic which lends itself to easy shaping and finishing. The surfaces of the frames 11 that fit next to the face are finished to present a smooth surface. Since the two frames 11 are counterparts, and therefore symmetrical and identical, I need only describe one of them in detail.

The outer end of the frame 11 is circular, and threaded as shown at 15. Screwed onto the threaded end 15 is an internally threaded ferrule 16 provided with an inturned flange 17. This ferrule preferably is made of a light material, as for example a molded plastic, but, of course, the particular material of which it is made is not essential to the invention. The ferrule 16 is of sufficient axial length that lenses 19 and 20 may be secured between the flange 17 and the outer end of the frame 11 (see Figure 5). The lens 19 is a clear lens, i. e., a lens that is transparent or substantially so. The lens 20 is a segmental lens disposed on the inner surface of the lens 19 and covering the upper portion thereof. This lens is a deeply colored lens suitable for shutting out the harmful light rays from welding operations.

Secured also between the flange 17 and the frame 11 is a shield 21 made of a light sheet metal stamping. To form the shield a blank is cut and stamped to leave an opening 22, an annulus 24, and a skirt portion 25. The outer edge of the annulus 24 is turned in, forming a flange 26 in which the lens 19 is adapted to be positioned. The flange 17 bearing on the annulus 24 retains the shield in position over the outer surface of the lenses. On the rear edge of the flange 26 are lugs 27 which are bent inwardly over the edge of the lens 19. The lens 19 is, therefore, held in position in the shield 21. The lugs 27 extend rearwardly a short distance of the rear face of the lens 19 and are positioned at a proper height so that the bottom edge of the lens 20 will fit down against the top edges of the lugs and be held against rotation with respect to the shield 21. With the lenses and shield 19 in position as shown in Figures 4 and 5, the lens 20 is positioned over the opening 22, and the skirt 25 of the shield covers the bottom portion of the lens 19 which is not covered by the lens 20. With the lenses and shield in the position shown, the direct forward rays entering through the lenses must enter through the opening 22 and the lens 20, which prevents the intense rays from injuring the eyes. In the operation of stamping the shield, side skirts 23 are formed between the skirt 25 and the body portion or annulus 24 to shut out the light rays of the welding arc from entering at the side.

In the normal use of the goggles, the work is directly in front of the lenses, and the lens 20 protects the user from the rays of the flame, while the shield 21 prevents any of these rays from entering through the lower portion of the lens 19. When the operator interrupts the arc or flame, to get a good view of the work, the conventional goggles must ordinarily be removed because the dark lens is usually shaded too deeply to permit a good view. However, with the goggles of the present invention, the user, instead of removing the goggles, need only to tilt his head backward a slight distance and view the work through the clear lens 20 below the skirt 25 of the shield. This skirt is inclined downwardly sufficiently that no intense rays from the welding arc will enter below the skirt. The lower edge of the skirt 25 is shown curved, but it might be of any other shape, as for instance, cut straight, to provide a wider range of vision.

To afford ventilation, I have designed the fore end of the frame 11 and the ferrule 16 to provide passages for the admission of air into the frame. Around the outer edge of the frame 11 are a number of projections 29 with intervening spaces between them. Passages 30 are cut in the inner surface of the ferrule 16 through the threads, which passages are sufficiently deep to allow spaces between the bottom surfaces thereof and the threads 15. Air is permitted to pass through the passages 30 and through the spaces between the projections 29 into the interior of the frame 11. These passages, as will be noted, are directed from the rear toward the front, which prevents all possibility of the brilliant light rays from entering through them, and also prevents the entrance of sparks and flying particles.

In addition to this ventilating means, additional vents 31 to aid ventilation are provided on the side of each frame 11. Secured to the frame 11 is a baffle 32 attached thereto as by rivets 34 (see Figure 3) closing the rear edge of the vent 31. The baffle 32 is indented into the opening 31 and its forward end is free, and spaced from the forward edge of the vent 31. Secured over the baffle 32 is a baffle 36, spotwelded as indicated at 37 or otherwise suitably secured to the baffle 32. The baffle 36 closes entirely the forward edge of the vent 31 and is spaced at its other end from the rear edge of the vent, and the baffle as a whole is spaced outwardly from the baffle 32 allowing the passage of air from the rear to the space between the two baffles and into the interior of the frame at the forward edge of the baffle 32.

The baffle 36 is provided with an ear 39 extending outwardly and affording a means for securing the band 14 to the goggles.

It is to be understood that the details herein shown and described are not limiting, but illustrative, and that all variations in details and rearrangements of parts are to be regarded as within the spirit and scope of this invention.

I claim:

1. In an eyeshield of the class described, a frame with a circular opening, lens means mounted in said circular opening comprising a shaded portion and a clear portion, an opaque shield for partially covering said clear portion and provided with an annulus, said shield extending downwardly and forwardly over said clear portion for compelling the line of vision through said clear portion to be inclined at an angle to the line of vision through said shaded portion said frame being provided with serial projections at said circular opening, and a ferrule engageable with said frame and adapted to secure said lens and said annulus and thereby said shield to said frame in contact with said projections, said ferrule having passages therein communicating with atmosphere at the rear edge of the ferrule and extending forwardly thereof next to said frame for the admission of atmosphere therethrough and through the spaces between said projections into the interior of said frame.

2. In an eyeshield of the class described, a frame with a circular opening for the reception of a lens, said frame at said circular opening being provided with serial projections, a lens, and a ferrule engageable with said frame and adapted to secure said lens to said frame in contact with said projections, said ferrule having longitudinally extending passages formed therein opening to the atmosphere at the rear edge of said ferrule and extending forwardly therein next to said frame for the admission of atmosphere therethrough and through the spaces between said projections into the interior of said frame, said frame being provided with supplemental passages rearward of said lens for the admission of atmosphere into the interior of said frame in a direction toward said lens.

3. In an eye shield to be worn for welding, metal cutting and the like, the combination of a frame defining two eye openings, a lens carried in each opening comprising an upper shaded portion and a lower clear portion, a protective shield for each eye opening extending outwardly and downwardly over the lower clear portion of its associated lens, whereby said shield places no restriction on forward vision through said shaded upper portion of said lens but restricts vision through said lower clear portion to a downward angle so as to require that the head be tilted back when looking through said lower clear portion, an annulus for each shield, and a ferrule for each annulus engageable with said frame around one of said eye openings and adapted to engage said annulus and said lens and thereby secure said shield and said lens to said frame.

RICHARD C. INGWERSEN.